United States Patent [19]
Sarma

[11] Patent Number: 5,717,474
[45] Date of Patent: Feb. 10, 1998

[54] WIDE-VIEWING ANGLE MULTI-DOMAIN HALFTONE ACTIVE MATRIX LIQUID CRYSTAL DISPLAY HAVING COMPENSATING RETARDATION

[75] Inventor: Kalluri R. Sarma, Mesa, Ariz.

[73] Assignee: Honeywell Inc., Minneapolis, Minn.

[21] Appl. No.: 315,363

[22] Filed: Sep. 30, 1994

[51] Int. Cl.⁶ ............................................. G02F 1/1333
[52] U.S. Cl. ............................................. 349/85; 349/117
[58] Field of Search ........................... 359/78, 84, 55, 359/75; 349/117, 85, 123, 144, 147, 38, 39

[56] References Cited

U.S. PATENT DOCUMENTS

| | | | |
|---|---|---|---|
| 4,632,514 | 12/1986 | Ogawa et al. | 340/784 |
| 5,126,865 | 6/1992 | Sarma | 359/59 |
| 5,204,659 | 4/1993 | Sarma | 350/339 |
| 5,410,422 | 4/1995 | Bos | 359/73 |
| 5,473,455 | 12/1995 | Koike et al. | 359/78 |

FOREIGN PATENT DOCUMENTS

| | | |
|---|---|---|
| 0152827A3 | 8/1985 | European Pat. Off. . |
| 0549283A3 | 6/1993 | European Pat. Off. . |
| 0631172A1 | 12/1994 | European Pat. Off. . |

OTHER PUBLICATIONS

Abstract "Liq crystal display with cryolite layers–contg. magnesium fluoride at interface with atmos., impoves signal visibility", 22 Jun. 1982, JP57100411 A (Suwa Seikosha KK) from WPI Database, Derwent Pubs.

H. Ong, "S7–4 New Normally White Negative Birefringence Film Compensated Twisted Nematic LCD's with Largest Viewing Angle Performance," *Japan Display 92*, pp. 247–250.

K. Takatori et al., "S15–6 A Complementary TN LCD with Wide–Viewing–Angle Grayscale," *Japan Display 92*, pp. 591–594.

K. Sarma et al., "Active Matrix LCDs Using Gray Scale in Halftone Methods,", *Proceedings of the SID*, vol. 31/1, 1990, pp. 7–11.

Y. Koike et al, "41.5: Late–News Paper: A Full Color TFT–LCD with a Domain Divided Twisted–Nematic Structure," *SID92 Digest* (ISSN0097–0966X/92/0000–798) pp. 798–801.

M. Schadt et al., "Surface–Induced Parallel Alignment of Liquid Crystals by Linearly Polymerized Photopolymers," *Jpn. J. Appl. Phys.* vol. 33 (1992) pt. 1, No. 7, pp. 2155–2164.

C. Gooch et al., "The optical properties of twisted nematic liquid crystal structures with twist angles $\leq 90°$."*J. Phys. D: Appl. Phys.*, vol. 8, 1975, Great Britain, pp. 1575–1584.

*Primary Examiner*—William L. Sikes
*Assistant Examiner*—James A. Dudek
*Attorney, Agent, or Firm*—John G. Shudy, Jr.; Brett Carlson

[57] ABSTRACT

A multi-domain halftone gray scale active matrix liquid crystal display utilizing a mono-gap configuration for achieving a very wide viewing angle at a low-cost. The substrate of the display has areas having a rub or an alignment of different directions from the direction of the rub or alignment in other adjacent areas. Each pixel of the gray scale matrix has a plurality of subpixels such that each subpixel turns on at a different voltage than that of the other subpixels. The areas involving different rubs or alignments on the substrates may be areas of pixels or subpixels. At least one compensating retardation layer is formed on the display. The technique of enabling the combining of multiple domains and compensation with halftone grayscale pixels results in a display having significantly wider viewing angles than either a multi-domain display or a halftone grayscale display, whether compensated for or not.

21 Claims, 13 Drawing Sheets

WIDE-VIEWING ANGLE MULTI-DOMAIN HALFTONE ACTIVE MATRIX LIQUID CRYSTAL DISPLAY HAVING COMPENSATING RETARDATION

BACKGROUND OF THE INVENTION

The invention pertains to displays and particularly to liquid crystal displays. More particularly, the invention pertains to wide viewing angle liquid crystal displays.

The active matrix liquid crystal display (AMLCD) is presently the most advanced of the flat panel display technologies used in applications including avionics displays, flat-screen televisions, note-book personal computers and engineering computer workstations. While many attributes of the AMLCDs are superior to competing display technologies, there is one significant shortcoming of the LCDs, namely, the limited viewing angle, particularly in the vertical direction, which continues to be an important motivation for the development of alternative technologies such as plasma, electroluminescent and field emission displays. At the moment, much effort is being spent around the world to improve AMLCD's viewing angle. This effort has had limited success. To improve the viewing angle of the AMLCDs, several approaches have been developed and used. These approaches include: optimization of the liquid crystal cell gap, i.e., use of multi-gap (1. "The optical properties of twisted nematic liquid crystal structures with twist angles≦90°", C. H. Gooch and H. A. Tarry, *J. Phys. D. Appl. Phys.*, Vol. 8, p. 1575, 1975; 2. "Color liquid crystal display apparatus", T. Ogawa et al., U.S. Pat. No. 4,632,514, Dec. 30, 1986), use of compensation films ("New Normally White Negative Birefringence Film Compensated Twisted Nematic LCDs with Largest Viewing Angle Performance", H. L. Ong, *Japan Display* '92, pp. 247–250), and halftone grayscale ("Active-Matrix LCDs Using Gray Scale in Halftone Methods," K. Sarma et al., *Proceedings of SID*, Vol. 31/1, pp. 7–11, 1990). However, none of these approaches results in AMLCDs with a viewing angle approaching that of a common cathode ray tube (CRT). Also, none of these approaches appreciably improves the vertical viewing angle, which is a major problem in AMLCDs. Further, the multi-gap configuration which is used to improve viewing angle in the related art high performance AMLCDs is very expensive. U.S. Pat. No. 4,632,514, by T. Ogawa et al., issued Dec. 30, 1986, and entitled "Color Liquid Crystal Display Apparatus", is hereby incorporated by reference. U.S. Pat. No. 4,632,514 discloses a multi-gap color liquid crystal display.

FIG. 1a shows the gray level luminance in foot Lambert units versus the horizontal viewing angle in degrees in a prior art typical normally black multi-gap AMLCD using a halftone grayscale and compensation films. FIG. 1b shows the gray level luminance in foot Lambert units versus the vertical viewing angle in degrees in a normally black multi-gap AMLCD using halftone grayscale and compensation films. Each of FIGS. 1a and 1b shows the luminance variation for eight gray levels as a function of horizontal and vertical viewing angles. Although the gray levels are reasonably symmetric and stable for horizontal viewing angles ranging from +40 to −40 degrees, the gray levels for the vertical viewing angle are quite varied and asymmetric. Naturally, this severely limits the useful vertical viewing angle of the display. For instance, when the viewing angle goes beyond −25 degrees in the negative vertical direction, the gray level contrast and image quality are drastically reduced, i.e., the gray levels become indistinguishable. Additionally, a further increase of the vertical viewing angle in the negative direction results in a graylevel inversion or reversed image, i.e., the bright regions of the image become dark and the dark regions of the image become bright. Such contrast reduction, graylevel inversion and the resulting severe limitation of the vertical viewing angle adversely affects the application and usefulness of AMLCDs.

In the related art, dual domain techniques ("A Complementary TN LCD with Wide-Viewing Angle Grayscale", K. Takatori et al., *Japan Display* '92, pp. 591–594) have been used to improve the vertical viewing angle of AMLCDs. In this approach, each pixel is divided into two domains, wherein each domain has a complementary tilt and thus a resulting complementary electro-optic behavior. FIGS. 2a and 2b illustrate a dual-domain LCD pixel. FIG. 2a shows the rubbing or alignment directions 16 and 18 on top glass substrate 24 for the two domains 12 and 14, respectively, to achieve the complementary tilts. Also shown are rubbing or alignment directions 20 and 22 on bottom glass substrate 26 for domains 12 and 14, respectively, for the achievement of the complementary tilts. FIG. 2b is a cross section of a pixel comprising display substrates 24 and 26 sandwiching domains 12 and 14, and shows the liquid crystal director orientation for domains 12 and 14. Since the vertical viewing angle of a conventional pixel is very non-symmetric, the use of two domains 12 and 14 having complementary tilts will spatially average the performance of the two domains and result in a symmetric electro-optic response, and in some improvement of the vertical viewing angle of the LCD. The vertical viewing angle characteristics of a typical normally black dual domain LCD are shown in FIG. 3 for eight gray levels. This figure shows the luminescence in foot Lambert units versus the vertical viewing angle in degrees with respect to the perpendicular of the display face. While the dual domain approach results in a symmetric vertical viewing angle, the luminances of the gray levels are not stable and vary considerably. At large vertical viewing angles (i.e., θ>45 degrees) gray-level inversion still takes place. Even though the dual domain approach improves the vertical viewing angle of the display to a certain extent in comparison to the conventional approach for LCDs, the viewing angle of the dual domain LCD is still significantly inferior to the viewing angle of a CRT because the graylevel luminances vary considerably and graylevel inversion still takes place for vertical viewing angles exceeding 45 degrees.

SUMMARY OF THE INVENTION

An objective of the present invention is to improve the viewing angle, more particularly, the vertical viewing angle, of an AMLCD by achieving gray level luminance values that are not only symmetric around the display normal, but also more stable as a function of vertical viewing angle.

Another objective of the invention is to permit fabrication of wide viewing angle AMLCDs at low cost, by eliminating the need for an expensive multi-gap configuration. The present invention uses a multi-domain approach in combination with half-tone gray scale and a compensative retardation film. This invention dramatically improves the viewing angle of AMLCDs. It provides more stable gray levels for wider vertical viewing angles similar to that of a cathode ray tube (CRT). Further, the present approach reduces the cost of wide viewing angle AMLCDs because mono-gap configuration can be used to achieve the improved viewing angle. The manufacturing cost of the multi-gap AMLCDs (used for achieving the wide viewing angle in the prior art as shown in FIG. 1) is very high due to the need for critical control of the liquid crystal cell gap for the red, green, and blue pixels separately. Such high cost hinders extensive use of multi-gap AMLCDs. The multi-domain halftone approach permits the use of a mono-gap LCD configuration for achieving a wide viewing angle, thereby eliminating the need for the expensive multi-gap configuration.

BRIEF DESCRIPTION OF THE DRAWING

FIG. 7b is an electrical equivalent circuit of the pixel in FIG. 7a.

DESCRIPTION OF THE EMBODIMENTS

Figure 1A:
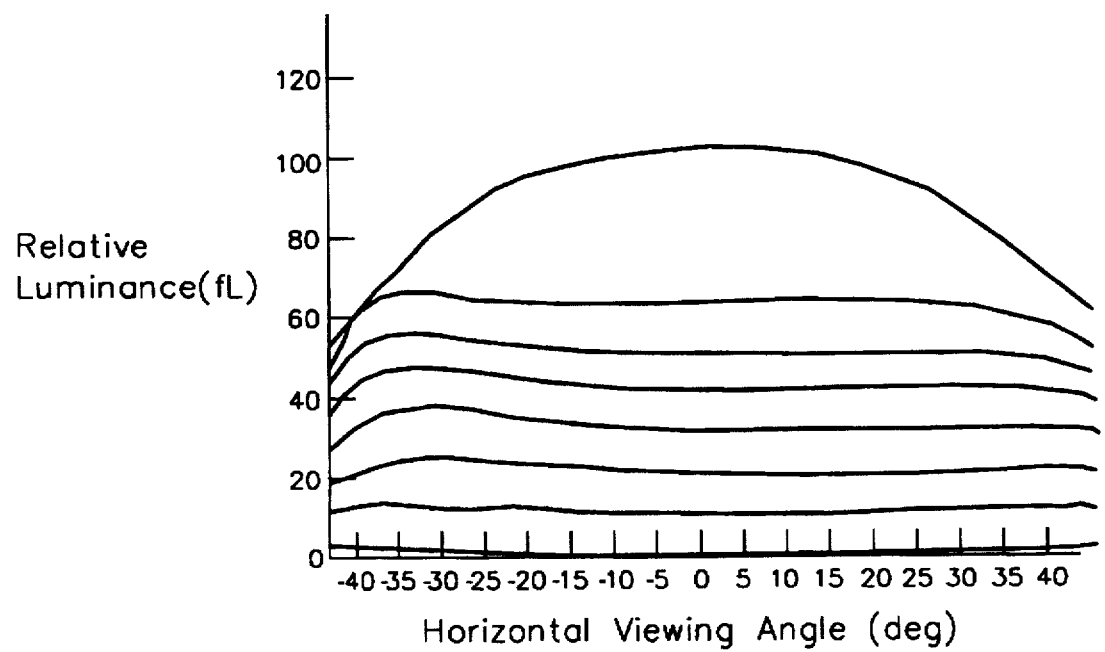
FIGS. 1a and 1b show the viewing angle characteristics of a normally black multi-gap LCD with halftone gray scale and compensation films of the related art.
Figure 1B:
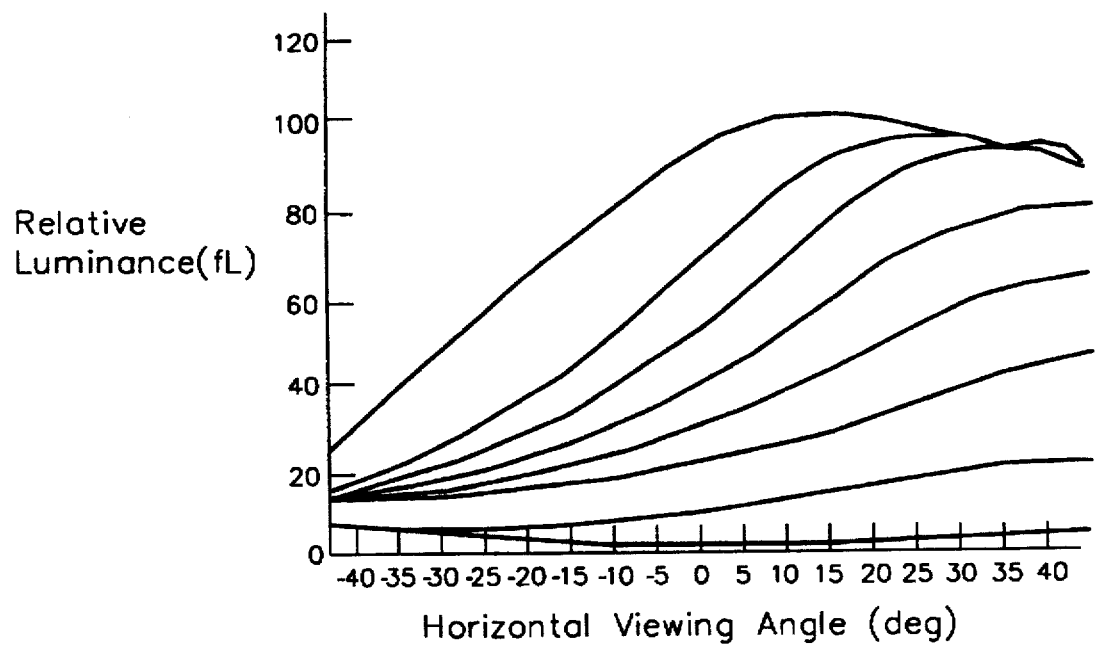
Figure 2A:
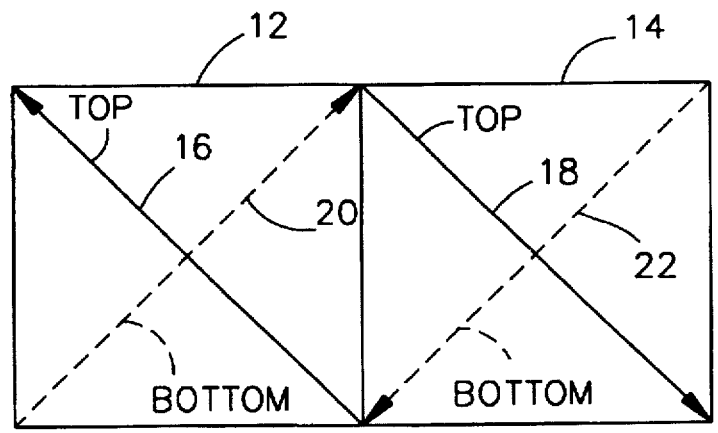
FIGS. 2a and 2b illustrate the rubbing or alignment directions and the liquid crystal director orientation for a dual-domain LCD pixel of the related art.
Figure 2B:
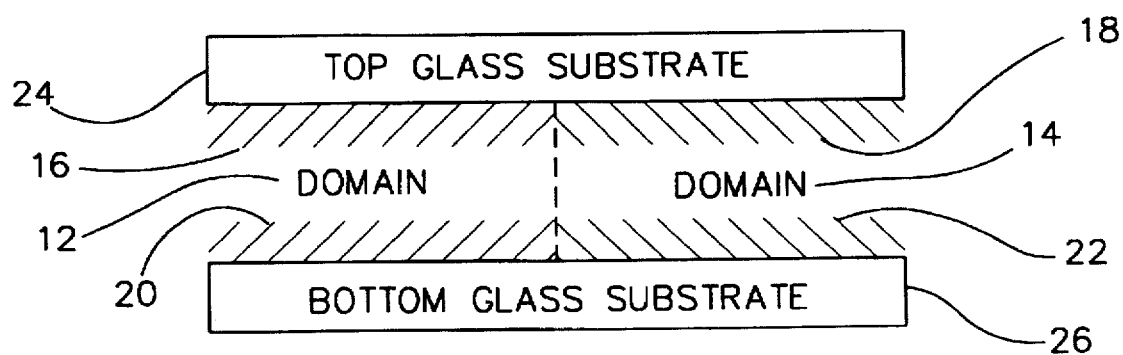
Figure 3:
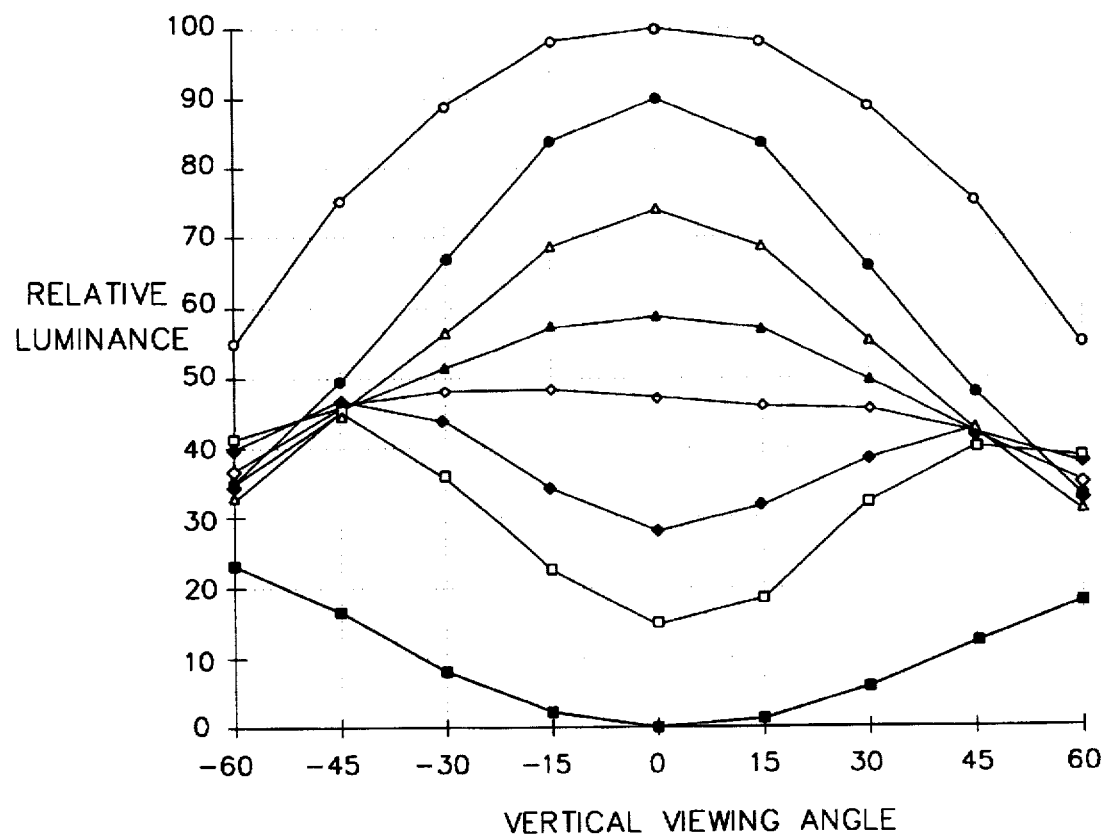
FIG. 3 reveals the vertical viewing angle characteristics for a typical normally black dual-domain LCD of the related art.
Figure 4A:
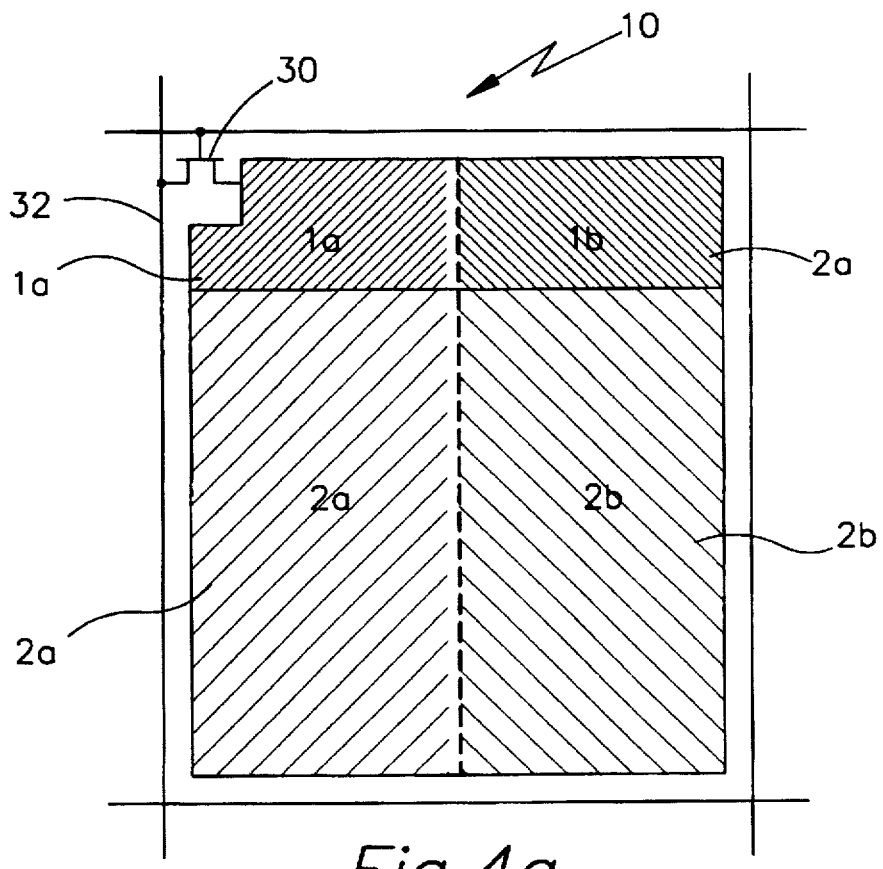
FIGS. 4a and 4b show the pixel layout and the electrical equivalent of a pixel, respectively, of the present invention.
Figure 4B:
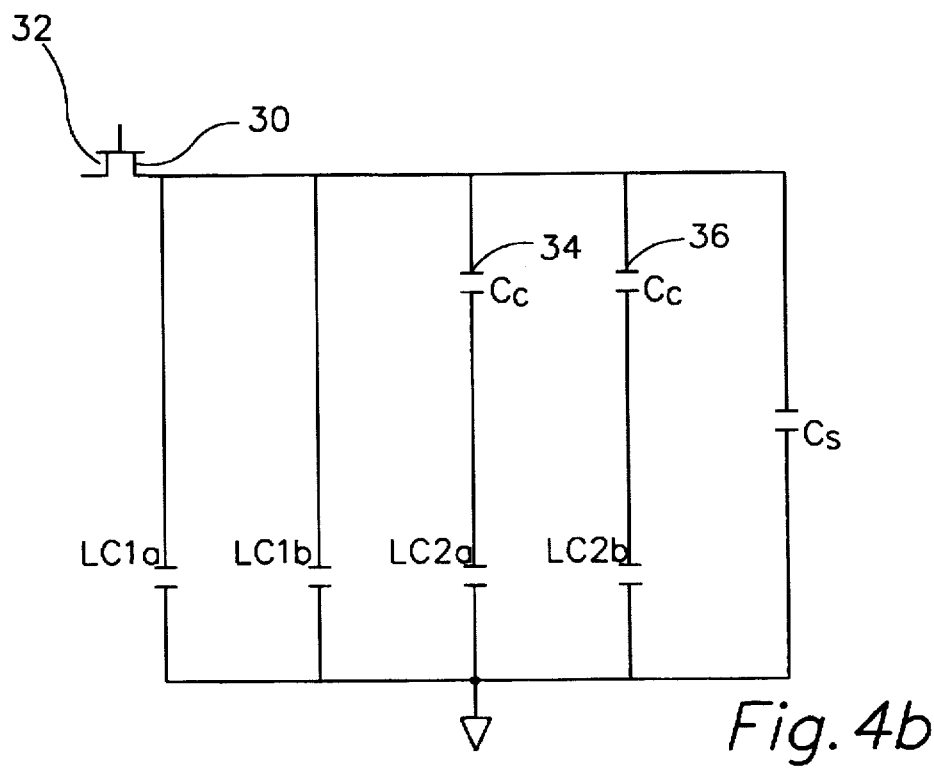
Figure 12:
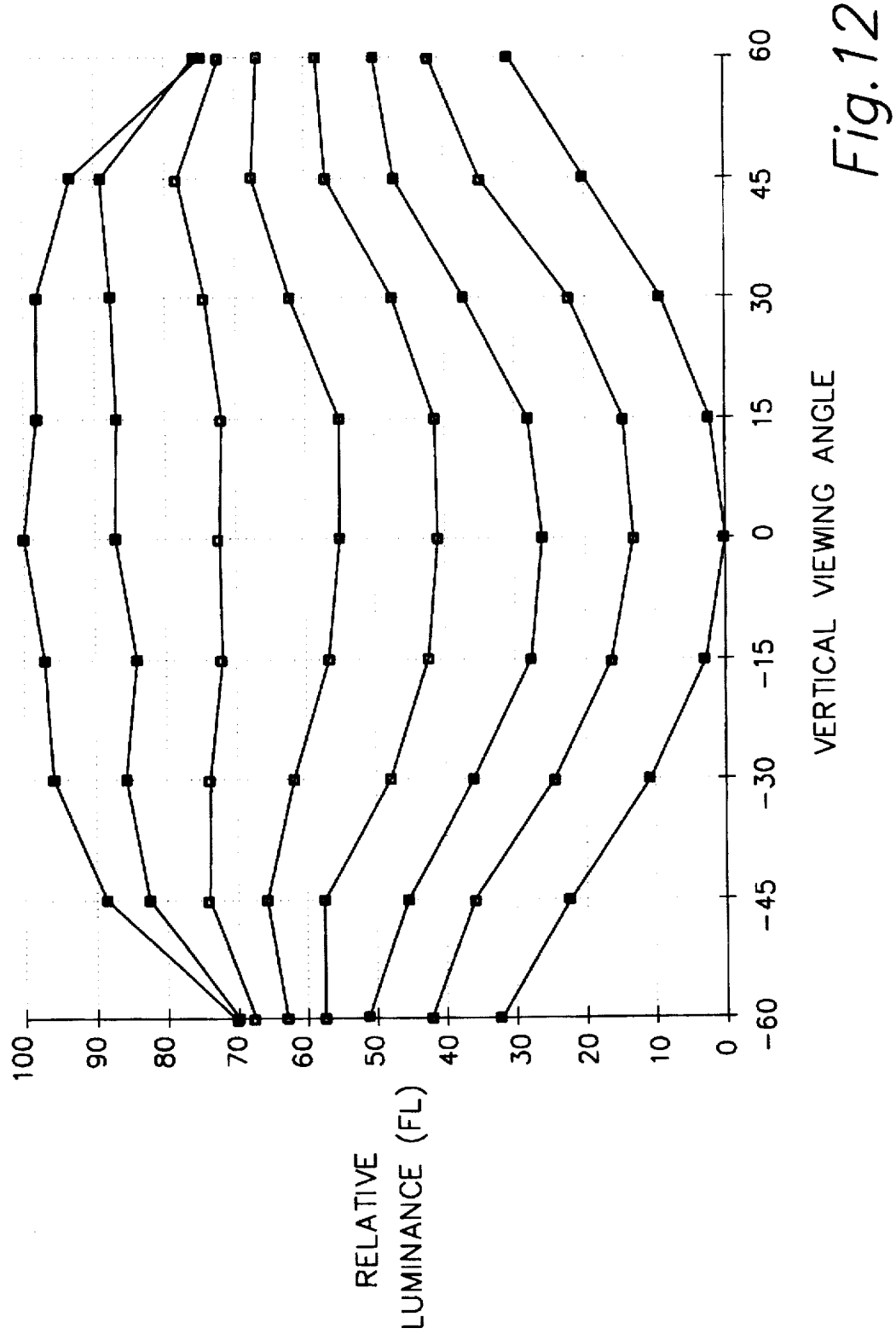
FIG. 12 is a graph showing the vertical viewing angle characteristics of the multi-domain halftone gray scale LCD.
Figure 13:
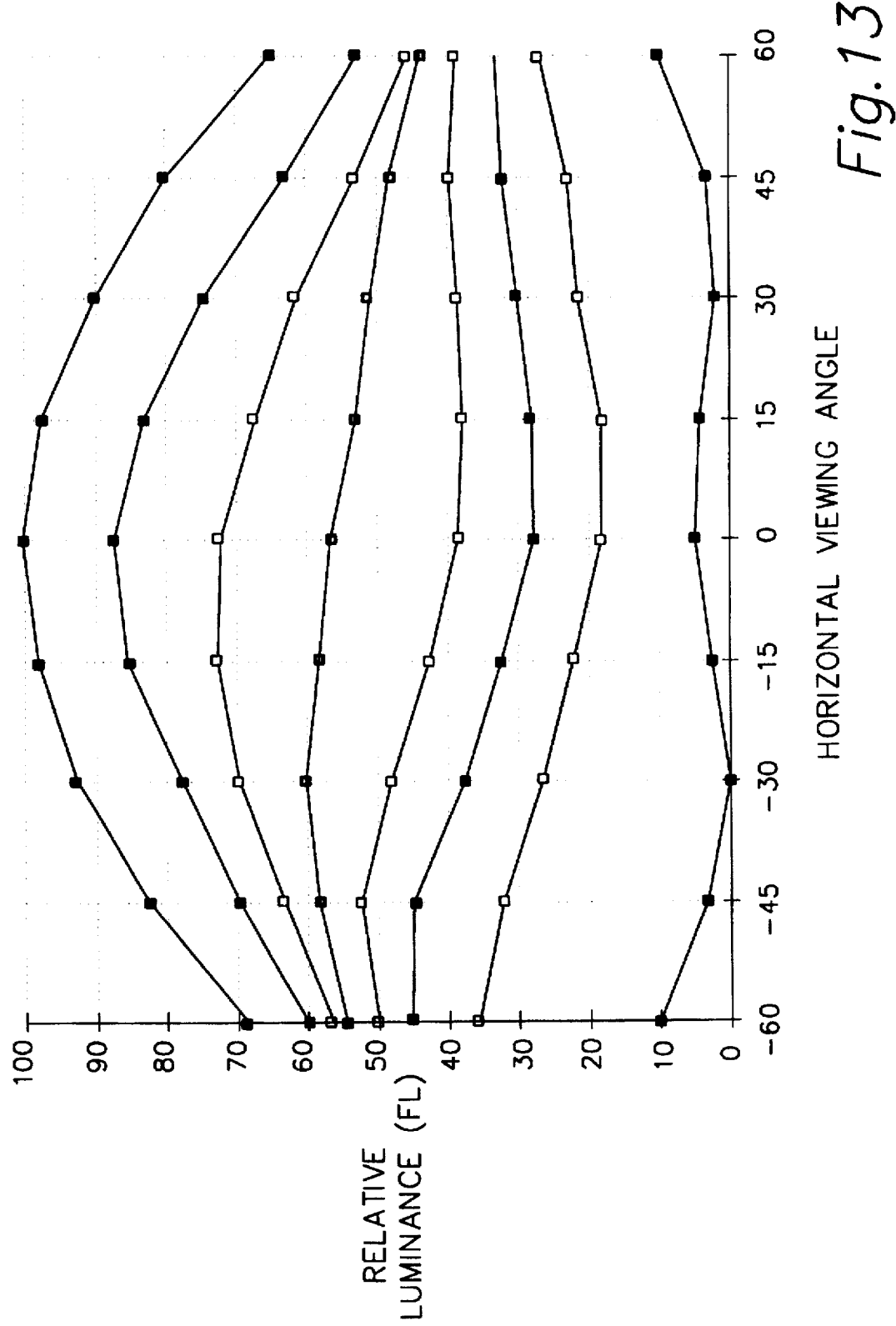
FIG. 13 is a graph showing the horizontal viewing angle characteristics of the multi-domain halftone gray scale LCD.

Pixel 10, in FIG. 4a, of the present invention provides a substantial improvement in vertical viewing angles in comparison to AMLCD displays in the related art as one can see by comparing the data of FIGS. 12 and 13 with the related art data of FIGS. 1a, 1b, 2a, 2b and 3. A multi-domain approach is used in combination with a halftone gray scale. Pixel 10 is divided into subpixels and each subpixel is divided into complementary domains. In FIG. 4a, there are two subpixels 1 and 2 and two complementary domains a and b. Subpixel 1 in domain a is labeled subpixel 1a, subpixel 1 in domain b is subpixel 1b, subpixel 2 in domain a is subpixel 2a and subpixel 2 in domain b is subpixel 2b. Thin film transistor 30 is the switch for turning on pixel 10. FIG. 4b is a schematic of the electrical equivalent of pixel 10. Capacitors LC1a and LC1b represent subpixel 1 with domain orientations a and b, respectively. Similarly, capacitors LC2a and LC2b represent subpixel 2 with domain orientations a and b, respectively. Cs represents the pixel storage capacitance. Subpixel 1 of domains a and b operates directly by the application of the data voltage on source buss 32 of thin film transistor (TFT) 30. The operation of subpixel 2 of domains a and b is controlled by control capacitors 34 and 36. Control capacitors 34 and 36 have values such that subpixel 2 of both domains does not begin to operate until subpixel 1 of both domains reaches saturation. Thus, by controlling the lower gray levels of pixel 10 by the saturated state of subpixel 1, the gray levels can be significantly stabilized to achieve a superior vertical viewing angle for pixel 10. Although only two subpixels 1 and 2 are shown in FIG. 4a, a greater number of subpixels may be used to achieve a more improved optimum viewing angle performance. Similarly, while only two complementary domains are shown, a greater number of complementary domains, such as four, six or eight complementary domains, may be used to achieve more homogeneous viewing angle performance around the display normal. Also, as shown in FIG. 4a, the relative areas of subpixels can be varied to achieve optimum performance.

Figure 5A:
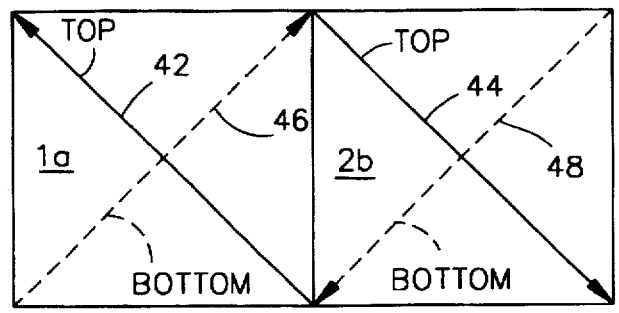
FIGS. 5a and 5b illustrate the multi-domain halftone gray scale LCD.
Figure 5B:
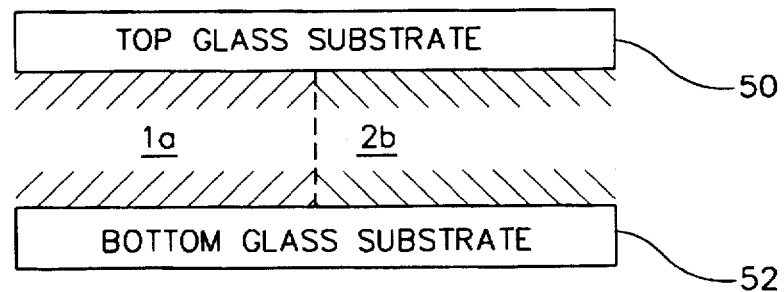
Figure 5C:
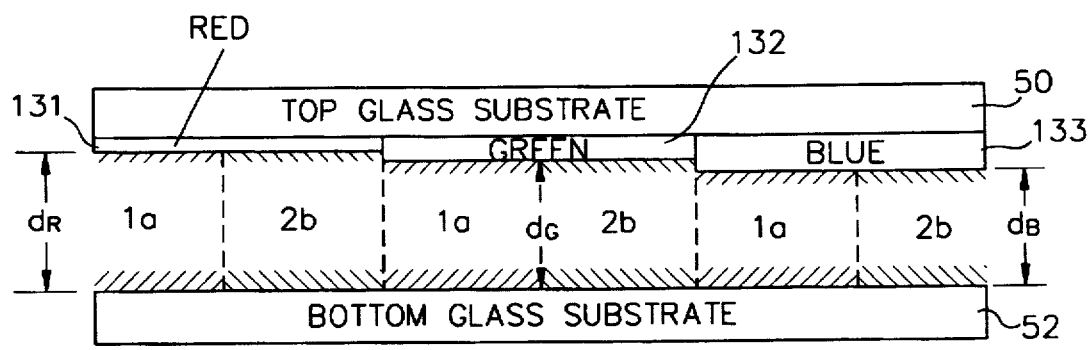
FIG. 5c shows a cross-section through a LCD region of three pixels having red (R), green (G) and blue (B) color filters as shown by gap sizes $d_R$, $d_G$ and $d_B$ provided by gap-steps 131, 132 and 133, respectively, on top glass substrate 50. Each of the R, G and B pixels has subpixels 1 and 2 and domains a and b as in FIG. 5b.

FIG. 5a is another layout showing two subpixels and the rubbing or alignment directions with respect to two kinds of domains a and b, congruent to subpixels 1 and 2, respectively. The alignment directions are often referred to rubbing directions here; however, alignment directions may be achieved with techniques not involving rubbing. FIG. 5b is a cross section of the pixel showing the liquid crystal director orientation for each of the domains a and b and subpixels 1 and 2, and does not show the physical layout in the same way that subpixels 1 and 2 in domains a and b of pixel 10 appear in FIG. 4a. Rubbing direction 42 on top glass substrate 50 is for subpixel 1 and rubbing direction 44 in the opposite direction of FIG. 5a is for subpixel 2 on substrate 50 in FIG. 5b. Rubbing direction 46 is for subpixel 1 on bottom glass substrate 52 and rubbing direction 48 of the opposite direction to that of direction 46 is on glass substrate 52 for subpixel 2. The rubbing directions on the top and bottom substrates 50 and 52, respectively, encompassing the same domain (a or b), are at 90 degrees relative to each other.

Figure 6:
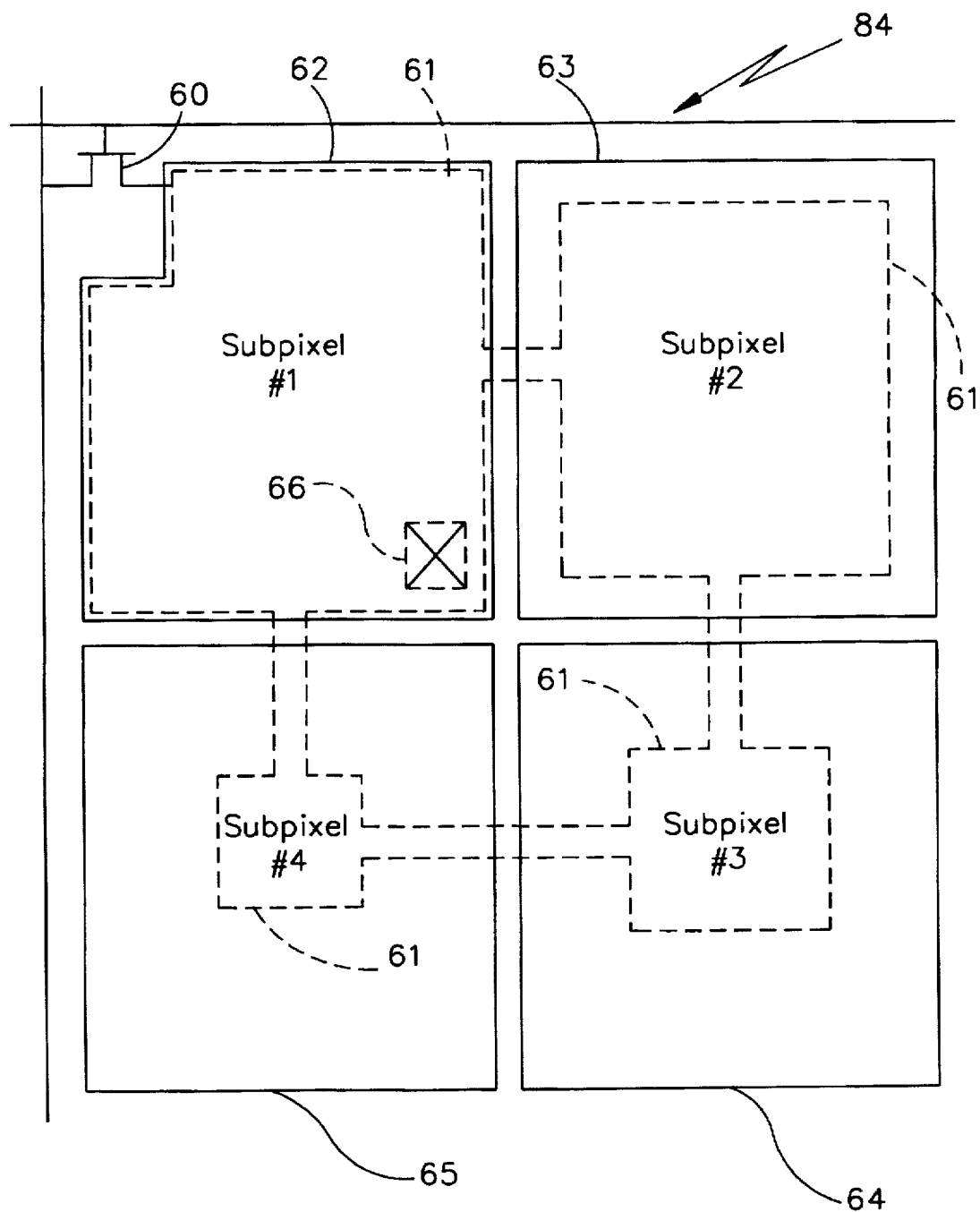
FIG. 6 shows a schematic of a pixel with four subpixels used in the fabrication of a multi-domain halftone gray scale display according to the invention.
Figure 7A:
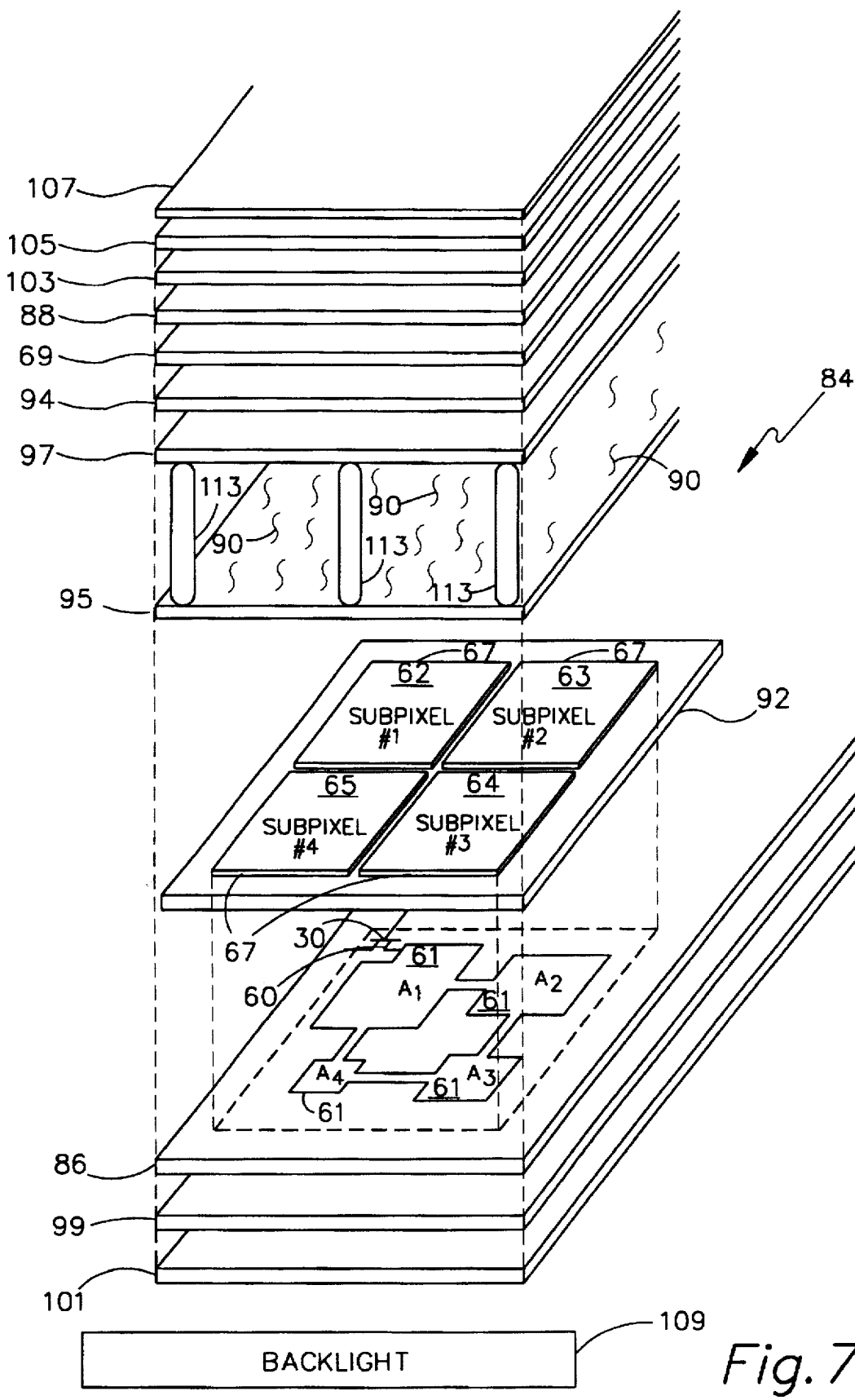
FIG. 7a is a break-away view of the pixel having subpixels with various sized control capacitors.
Figure 7B:
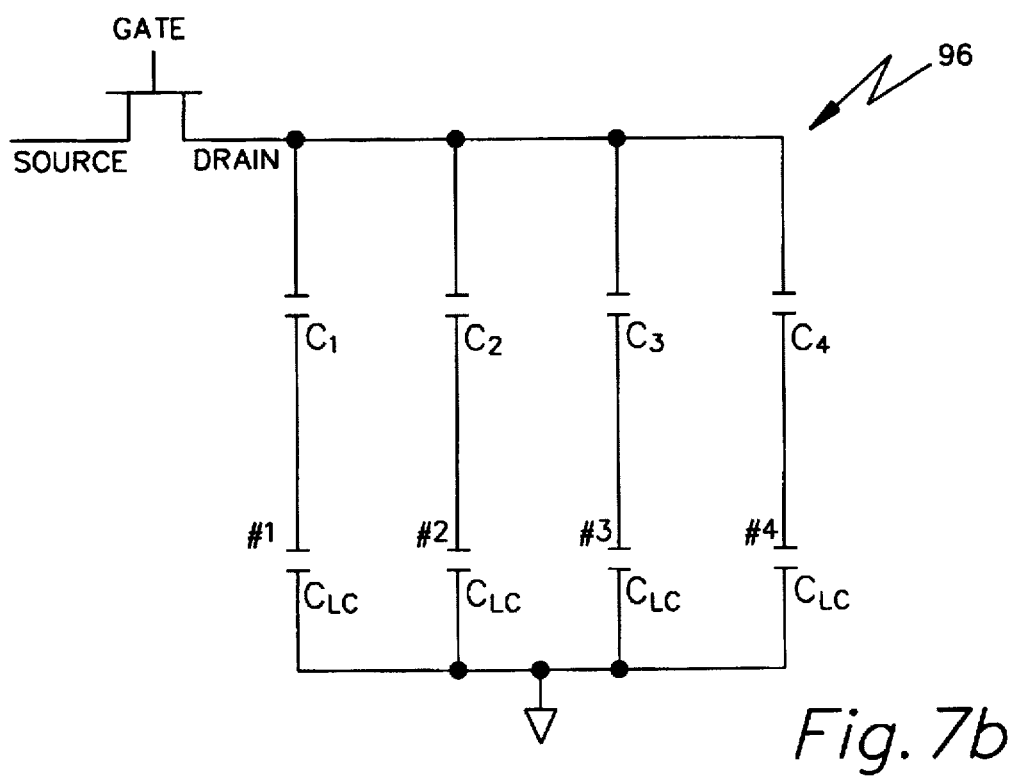

In FIGS. 6, 7a and 7b, an example illustrating a structure 84 of a multi-domain halftone display is shown. Initially, the TFT array having halftone subpixels with control capacitors is fabricated on a first glass substrate 86, which is about 43 mils thick. The control capacitors $C_1$, $C_2$, $C_3$, and $C_4$ for subpixels 62, 63, 64 and 65, respectively, are fabricated by varying the overlap area of a first indium tin oxide (ITO) electrode 61 (that is connected to the TFT drain 60) with a second ITO electrode 67 defining subpixels 62, 63, 64 and 65. First and second ITO layers 61 and 67 are about 1000 angstroms thick and are separated by control capacitor dielectric 92, with an option of a via 66 (shown in FIG. 6) for connecting ITO layer 61 to the #1 subpixel 62 portion of ITO layer 67. This via contact 66 allows the full data voltage from the TFT to be applied to #1 subpixel 62, rather than depending on the capacitance $C_1$ between ITO layer 61 and the subpixel 62 portion of ITO layer 67 for turning on subpixel 62. Via 66 shorts out control capacitor $C_1$. Dielectric layer 92 is about 5000 angstroms thick and is made of silicon dioxide.

Figure 8:
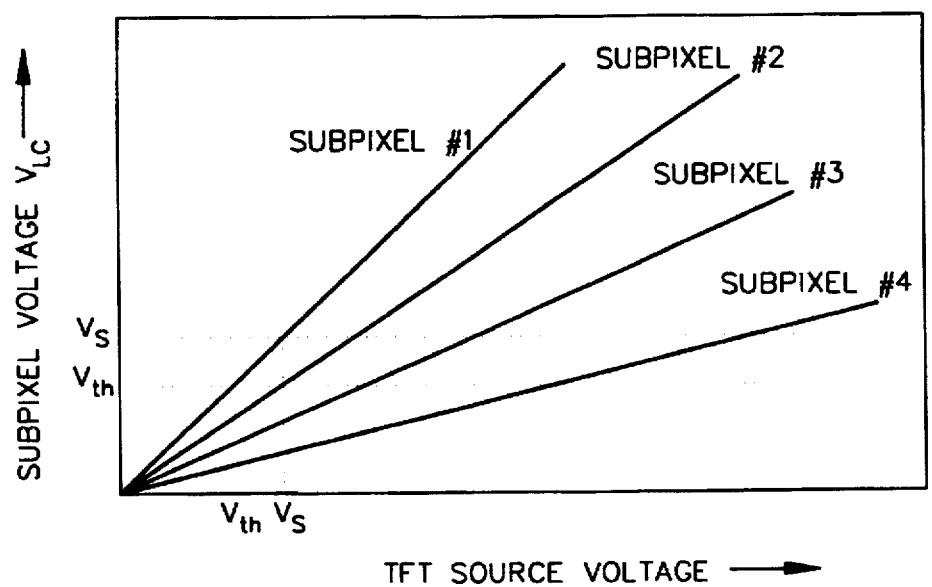
FIG. 8 is a graph that reveals the transistor source voltages needed to turn on the various subpixels.

FIG. 8 shows the TFT source voltages for turning on subpixels 62, 63, 64 and 65, respectively. $V_{TH}$ is the threshold voltage and $V_S$ is the saturation voltage for the liquid crystal material. $V_{LC}$ is the voltage across the electrodes of the subpixel. $V_{TH}$ is when the pixel or subpixel begins to turn on with a ten percent luminance change. $V_S$ is the voltage at which the luminance of the pixel or subpixel exceeds ninety percent of the saturation value.

The $C_{LC}$, capacitance of equivalent circuit 96 in FIG. 7b is the capacitance between second ITO layer 67 functioning as individual subpixel electrodes on first substrate 86 and second ITO layer 94 functioning as the common electrode on second glass substrate 88 with liquid crystal material 90 as the dielectric, in FIG. 7a. Second glass substrate 88 has a thickness of about 43 mils and common electrode layer 94 has a thickness of about 1000 angstroms. Between second glass substrate 88 and electrode 94 is a color filter array 69, if structure 84 is for a color display. Color filter array 69 is about 2 to 3 microns thick and is composed of polyimide containing red, green and blue dyes. Immediately contacting liquid crystal material 90 are first and second polyimide alignment layers 95 and 97 which are each about 500 to 1000 angstroms thick. First polyimide alignment layer 95 is formed on ITO layer 67 and second polyimide alignment layer 97 is formed on common electrode ITO layer 94. Between alignment layers 95 and 97, besides liquid crystal material 90, are situated spacers 113 which may be pillars, cylinders or spheres, setting the distance between layers 95 and 97 and supporting a space for liquid crystal material 90. First ITO layer 61, along with TFT 30 is formed on one side of first glass substrate 86. On the other side of first glass substrate 86 is formed a first compensation or retardation film or layer 99. Formed on first compensation layer 99 is first polarizer 101. On second glass substrate 88 is formed a second compensation or retardation film or layer 103. Situated on compensation layer 103 is second polarizer 105. On second polarizer 105 is formed an antireflection and/or an electromagnetic interference resistive layer 107. Backlight 109 is situated proximate to first polarizer 101 for putting light through display 84 via layers 101, 99, 86, 61, 92, 67, 95, 90, 97, 94, 69, 88, 103, 105 and 107, on to a viewer. Backlight 109 may be a light source or ambient light. Or there may not be a backlight 109, and the viewer may rely on the reflected ambient light on the viewing side proximate to layer 107. The display may be viewed from the other side proximate to polarizer 101, with backlight 109, if needed, proximate to polarizer 105. In the latter situation, antireflection layer 107 may be formed on polarizer 101.

Figure 9:
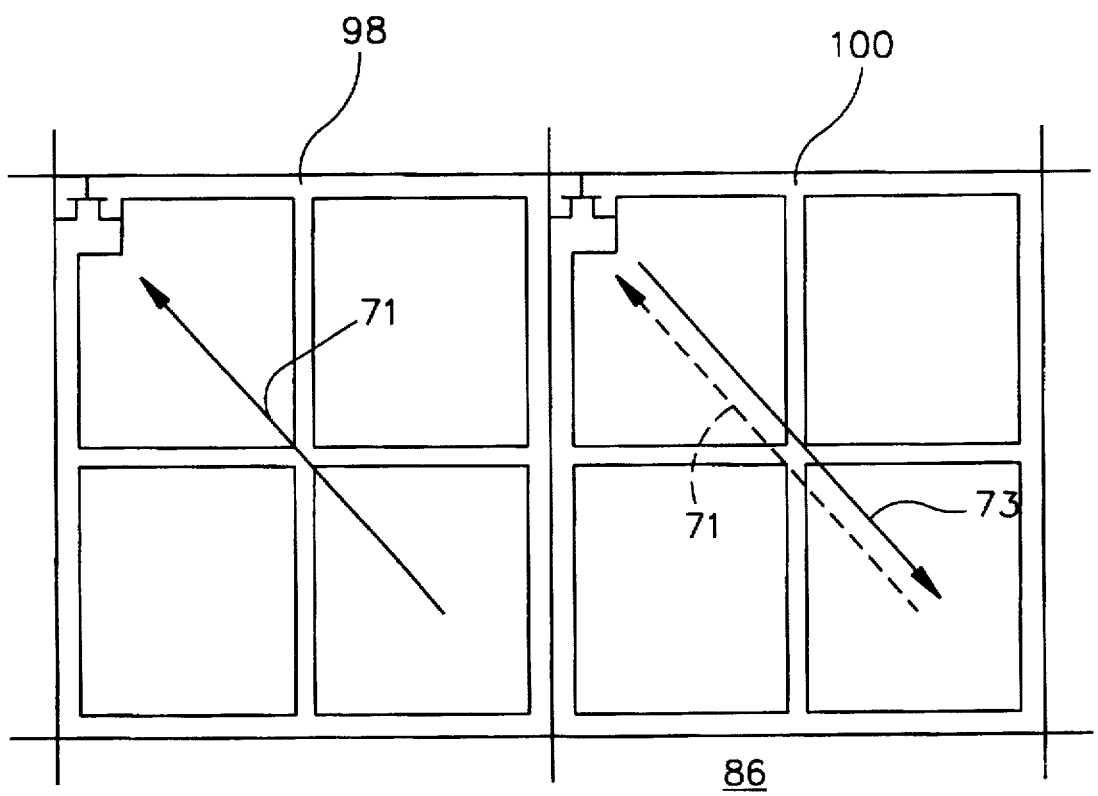
FIG. 9 shows a schematic of the first substrate of a multi-domain halftone gray scale display with adjacent pixels having complementary (rubbing or alignment) domains.
Figure 10:
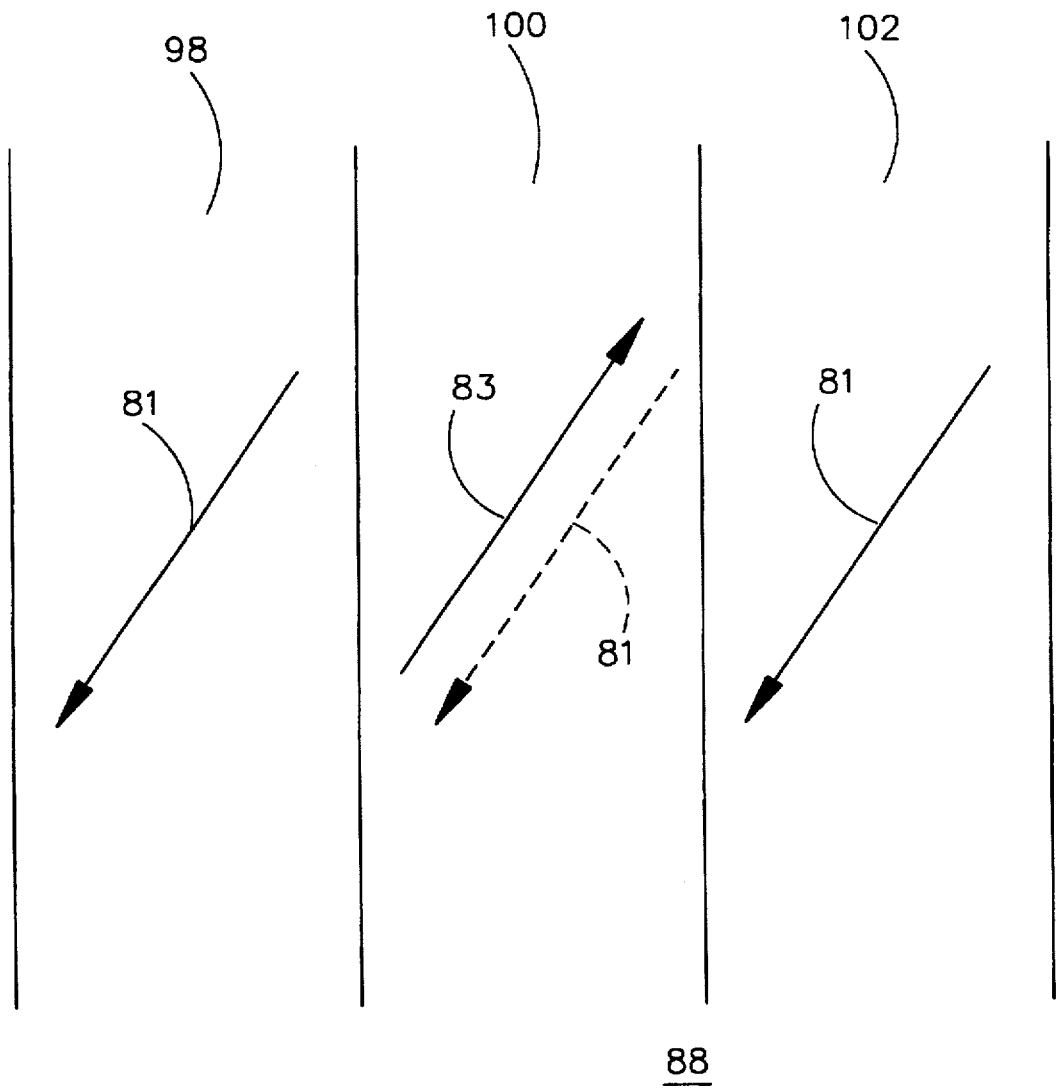
FIG. 10 illustrates the complementary rubbing or alignments on the adjacent pixel regions on the common electrode, second substrate of a multi-domain halftone gray scale LCD.

An example display has a pixel density of the display is 75 lines per inch, with 96 rows and 192 columns. Regions of complementary domains are created on substrate 86 on adjacent pixels 98 and 100, rather than adjacent subpixels as described above, as shown in FIG. 9, according to the following procedure. Substrate 86 of FIG. 7a is spin coated with a polyimide alignment layer, and rubbed at 45 degrees relative to the substrate orientation according to the standard LCD fabrication procedures, to achieve a first alignment direction 71. Then adjacent pixels, e.g., pixel 100, on substrate 86 are masked with a photoresist, using standard photolithography procedures, and the substrate is rubbed in the opposite direction to first rub 71 to achieve a complementary alignment direction 73 for the adjacent pixel regions, e.g., the pixel 100 region. Second rub 73 in the adjacent pixels cancels out the alignment effect of first rub 71. Then the photoresist protecting the first alignment regions is removed prior to display assembly operations.

Similarly, second glass substrate 88 containing the common ITO electrode is spin coated with a polyimide alignment layer, and subjected to first rub 81, photoresist masking of regions 98 and 102, second rub 83 affecting the unmasked region(s) 100, and photoresist removal operations from regions 98 and 102. Also, as described earlier, the effect of first rub 81 in regions of complementary domains, for instance, domain 100, is canceled by second rub 83. The rub of second substrate 88 is in a direction of 90 degrees relative the direction of the rub for the same congruent area of first substrate 86 to achieve a 90 degree twisted nematic LCD structure.

In one embodiment of the invention, each pixel has dual/multiple domains. In an alternate embodiment, adjacent halftone pixels have complementary domains. One can still achieve spatial integration of the complementary characteristics, even though it not as effective as the configuration having each pixel with complementary domains.

Figure 11A:
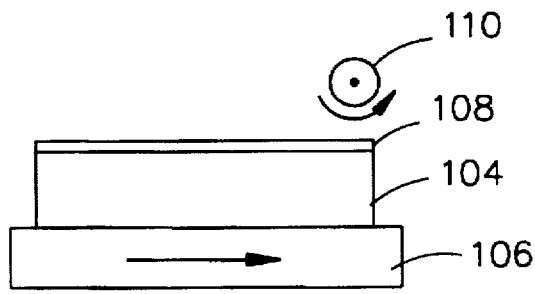
FIGS. 11a–11f reveal the steps of rubbing to attain a multi-domain substrate.
Figure 11B:
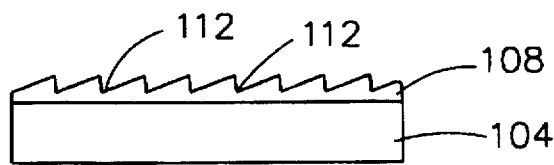
Figure 11C:
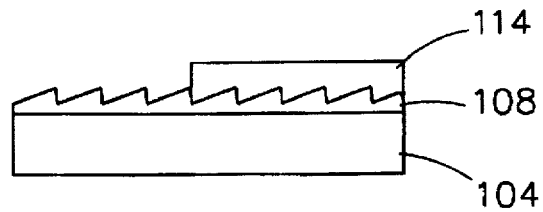
Figure 11D:
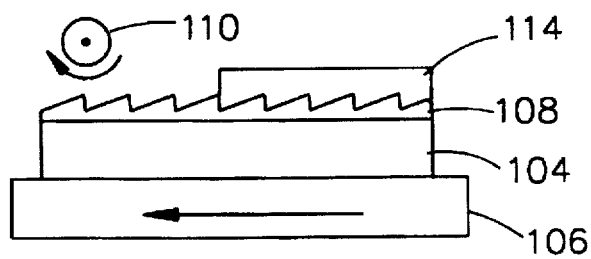
Figure 11E:
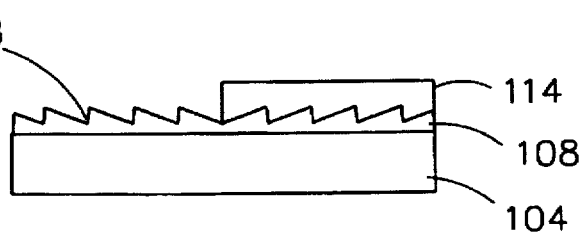
Figure 11F:
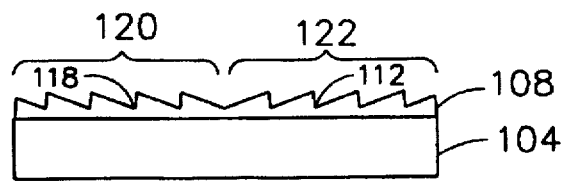

In FIG. 11a, a substrate 104 is placed on a movable platform 106. Substrate 104 is coated with a thin alignment layer 108 of polyimide which is put on as a liquid which is spun, dried, temperature baked and then rubbed. The rubbing on the surface of polyimide layer 108 of substrate 104 is caused by a counterclockwise spinning wheel 110 made from synthetic cloth that creates microgrooves 112, in polyimide layer 108 tilted to the right in FIG. 11b, on substrate 104, as substrate 104 moves on platform 106, of FIG. 11a. In FIG. 11c, a photoresist layer 114 is applied on the first domain region of rubbed polyimide layer 108. The unmasked portion of polyimide layer 108 is rubbed by clockwise rotating wheel 110 in FIG. 11d. Polyimide layer 108 and substrate 104 are moved relative to rotating wheel 110 by platform 106. Resulting microgrooves 118 in FIG. 11e have a tilt to the left. The result is substrate 104 having two complementary domains 120 and 122 rubbed in opposite directions, respectively, as shown in FIG. 11f.

Microgrooves 112 provide a surface or alignment force, which is a molecular force, for the alignment of liquid crystal molecules. There are two primary substrates in an LCD. In the case of an active matrix LCD, one is the active matrix substrate with the transistor array and the other is a substrate with a common electrode. If the display is for color, the color filters are placed underneath the common electrode substrate. Each of the both substrates has a polyimide alignment layer put on them. It is the polyimide alignment layer that is rubbed.

The molecules align along the grooves made by the rubbing. A boundary condition is made for liquid crystal molecules, such that the molecules align along the rubbing direction, approximately parallel (with a small tilt) to the substrate, resulting in a homogeneous orientation. Upon application of the electric field, the bulk of the liquid crystal molecules between the substrates rotate and align parallel to the field, resulting in a homeotropic orientation, and an electro-optic effect. Due to the molecular forces at the alignment layer, the molecules near the alignment layer do not align with the applied field. The rubbed layers of the first and second substrates, have grooves at a 90 degree twist relative to each other. The rubbing direction is at 45 degrees to the horizontal or vertical direction of the display. The rubbing direction is rotated by 90 degrees from one substrate to other. The orientation of the polarizers determines what happens as to the passage of light through the display. For a normally white display, the polarizers are crossed at 90 degrees relative to each other, and the output is bright when the field is not applied. In this case, the polarization vector of the incident light is rotated 90 degrees by the homogeneously oriented 90 degree twisted nematic LCD, and then the light passes through the second polarizer. When the field is applied and the polarization vector of the light is not rotated by the homeotropically oriented liquid crystal molecules, the second polarizer, which is crossed, extinguishes the light. A normally black display has parallel polarizers and thus has contrary results due to the application and non-application of the electric field, in contrast to the normally white display.

Polarizers are situated external to the liquid crystal assembly on the outside surface of the glass substrates. Each polarizer is generally aligned with the rubbing direction of the closest substrate, for optimum performance. However, if the rubbing directions are divided up for the domains, the polarizers are not divided up for the domains, but each is one uniform polarizer which functions for both domains.

In FIG. 7a, the rubbing of each substrate, 86 and 88, may be in one direction for the whole pixel or may be different for each subpixel area. One could make the whole pixel into one domain or make it into subdomains aligned with the subpixels. In another alternative, each subpixel could have several rubbing domains.

The first and second substrates 86 and 88 are aligned with respect to each other, such that the areas of first rub on the first substrate face the areas of the first rub on the second substrate and vice versa. Then these substrates are sealed, containing a space between them which is filled with the liquid crystal material 90 Merck ZLI 4792, using standard LCD assembly techniques with a cell gap spacing of 4.5 microns corresponding to the first minimum condition for a green color. Then polarizers are attached to the outside surfaces of the two substrates in a parallel orientation for a normally black mode of operation. This completed the fabrication of the multi-domain halftone LCD.

Compensation films 99 and 103 are utilized in combination with the multi-domain halftone gray scale LCD to reduce the light leakage in the black state at large viewing angles. Optical retardation films, which are also known as compensation films, will reduce the light leakage in the LCD black state at large viewing angles, caused by the birefringence of the liquid crystal material. These compensation films are placed on the outer surfaces of the display glass substrates 86 and 88, next to polarizers 101 and 107. Positive birefringence films ($\Delta n = n_e - n_o > 0$) are used for normally black mode displays, and negative birefringence films ($\Delta n = n_e - n_o < 0$) are used for normally white mode displays. In a normally black display, the "field-off state" (black state) is compensated, where as, in a normally white display, "the field-on state" (black state) is compensated. Black state (the lowest graylevel) uniformity, and stability across a wide viewing angle has a major influence on the display contrast and quality.

FIG. 12 is a graph showing measured vertical viewing angle characteristics of the multi-domain halftone gray scale LCD. The graph shows the luminance variation of eight graylevels as the vertical viewing angle is varied from –60 degrees to +60 degrees form display normal. As one can see, the gray scale luminances are very symmetric and stable across the viewing angle, with essentially no graylevel inversion from –60 to +55 degrees. One can see that a substantial improvement has been achieved in the gray level stability across a wide vertical viewing angle due the multi-domain halftone approach of FIG. 4, compared to the conventional dual-domain approach shown in FIG. 3.

FIG. 13 shows the measured horizontal viewing angle characteristics of the multi-domain halftone gray scale LCD. The graph shows the luminance variation of eight graylevels as the horizontal viewing angle is varied from –60 degrees to +60 degrees form display normal. Again, as one can see, the gray scale luminances are very stable with no graylevel inversion from –60 to +60 degrees. Thus, very stable graylevels, with no graylevel inversion is achieved using the multi-domain halftone gray scale approach across a wide viewing angle. The viewing angle performance of this display approaches that of a CRT with respect to graylevel stability across horizontal and vertical viewing angles.

While the above example describes the use of a normally black mode multi-domain halftone display, similar graylevel stability and enhanced viewing angle can be achieved using the multi-domain halftone gray scale approach using a normally white mode of operation also, with crossed polarizers.

Also, as one multi-domain fabrication approach is described above by way of an illustrative example, many other approaches can be utilized for the fabrication of complementary domains in a multi-domain halftone gray scale AMLCD. For instance, complementary domains may be fabricated by use of alignment layers with different pre-tilt capability but having a single rubbing operation for each substrate, and with fringe field methods for shaping the subpixel electrodes. Also, photopolymer alignment materials (M. Schadt et al., "Surface-Induced Parallel Alignment of Liquid Crystals by Linearly Polymerized Photopolymers", Jpn. J. Appl. Phys., Vol. 31, pp 2155–2164, (1992)) may be utilized to fabricate complementary domains instead of using polyimide alignment materials with multiple rubs.

Different subpixel designs may be employed. For example, the halftone subpixels may have a concentric design. Each pixel may have multiple complementary domains as in FIG. 4a, as opposed to adjacent pixels having complementary multiple domains as shown in FIG. 7. If each pixel is designed to have multiple domains, the disinclination line formed at the domain boundary is masked using a black matrix material, to eliminate its effect on display contrast reduction.

The multi-domain half-tone gray scale LCD is expected to be utilized without the multi-gap configuration for reducing the expense of wide viewing angle AMLCDs. The performance of such mono-gap display is satisfactory for most applications, where low cost and reasonably wide viewing angles are required. However, the multi-domain half-tone gray scale LCD may also be used in combination with a multi-gap configuration where achieving the best possible performance is more important than cost. In the design of the multi-domain halftone gray scale AMLCD, the number of complementary domains, the number of subpixels, the relative subpixel areas, and voltage ranges of subpixel operation may be varied to optimize the performance of the AMLCD.

I claim:

1. A wide viewing angle liquid crystal display comprising:

a first substrate;

a second substrate overlapping, approximately parallel to and at a first distance from said first substrate;

a plurality of pixels situated on and between said first and second substrates;

a first polyimide alignment layer formed on said first substrate, having a first plurality of areas;

a second polyimide alignment layer formed on second substrate, having a second plurality of areas;

wherein:

each pixel of said plurality of pixels, each area of said first plurality of areas of said first polyimide alignment layer, and each area of said second plurality of areas of said second polyimide alignment layer, are approximately the same size in area, and overlap one another, and are aligned with one another, in a one-to-one fashion;

each area of said first plurality of areas of said first polyimide alignment layer has an alignment direction that is at an approximately 180 degree angle to an alignment direction of adjacent areas of said first plurality of areas of said first polyimide alignment layer;

each area of said second plurality of areas of said second polyimide alignment layer has an alignment direction approximately 90 degrees different from an alignment direction of the area of said first plurality of areas of said first polyimide alignment layer that overlaps the area of said second plurality of areas; and each pixel of said plurality of pixels, comprises a plurality of subpixels wherein each subpixel has a different turn-on voltage from turn-on voltages of other subpixels of said plurality of subpixels such that an intensity of each pixel changes for different voltages applied to the pixel to provide grayscale capability of the pixel.

2. The display of claim 1 wherein:

each pixel of said plurality of pixels further comprises a dielectric layer formed on said first substrate;

each subpixel comprises:
a first electrode layer formed on said first substrate;
a dielectric layer formed on the first electrode layer; and
a second electrode formed on said dielectric layer.

3. The display of claim 2 further comprising:

a gap, having a liquid crystal material, situated between said first and second polyimide alignment layers;

a polarizer overlapping and approximately parallel to said second substrate; and a retarding compensating layer overlapping and approximately parallel to said first substrate, for reducing dark state light leakage for off-normal viewing angles caused by birefringence of the liquid crystal material.

4. The display of claim 3 wherein said gap provides color capability to said display.

5. The display of claim 3 wherein said gap is a multi-gap having spacings of at least two distances between the surfaces of said first and second substrates, the distances measured along a line perpendicular to the respective surfaces.

6. A wide viewing angle liquid crystal display comprising:

a first substrate;

a plurality of pixels situated on said first substrate;

wherein:
each pixel of said plurality of pixels has a first ITO layer, divided up into a plurality of subpixels having subpixel electrodes formed on a first surface of a dielectric layer; and a second ITO layer formed on said first substrate, said ITO layer divided up in to a plurality of various sized control electrodes, each control ITO electrode situated on a second surface of said dielectric layer, and each control ITO electrode proximate to a subpixel electrode of the plurality of subpixel electrodes, one subpixel electrode and one control electrode forming a subpixel control capacitor, for each subpixel;

a first polyimide layer formed on said plurality of pixels, having a first plurality of areas, each area of said plurality of areas being approximately a same size of and congruent to an area of a pixel of said plurality of pixels, each area of the first plurality of areas of said first polyimide layer having an alignment direction different from an alignment direction of each adjacent area of the first plurality of areas of said first polyimide layer;

a second glass substrate;

a common ITO electrode layer formed on said second glass substrate;

a second polyimide layer formed on said common ITO electrode layer, parallel to said first polyimide layer, having a second plurality of areas, each area of said second plurality of areas being approximately a same size of and congruent to an area of said first plurality of areas, each area of said second plurality of areas of said second polyimide layer having an alignment direction different from an alignment direction of an area of said first plurality of areas of said first polyimide layer, that is approximately congruent to the respective area of said second plurality of areas; and a layer of liquid crystal material situated between said first and second polyimide layers.

7. The display of claim 6 further comprising:

a first polarizer formed on said first glass substrate; and a second polarizer formed on said second glass substrate.

8. The display of claim 7 further comprising:

a first compensating layer situated approximately parallel and proximate to said first polarizer; and a second compensating layer situated approximately parallel and proximate to said second polarizer; and wherein said first and said compensating layers are for reducing dark state light leakage for off-normal viewing angles, caused by birefringence of the liquid crystal material.

9. The display of claim 8 further comprising at least one color filter situated between said second glass substrate and said common ITO electrode layer.

10. The display of claim 9 further comprising an antireflective film formed on said second polarizer.

11. The display of claim 10 further comprising a backlight proximate to said first polarizer.

12. The display of claim 9 further comprising an antireflective film formed on said first polarizer.

13. The display of claim 12 further comprising a backlight proximate to said second polarizer.

14. A wide viewing angle liquid crystal display having a plurality of pixels, wherein each pixel comprises:

a plurality of subpixels wherein each subpixel has a voltage range of operation controlled by a control element at the subpixel in such a way that a majority of the plurality of subpixels operate in a "fully-on" ($V_{LC} > V_s$) or "fully-off" ($V_{LC} < V_s$) mode as selected by a magnitude of applied voltage, resulting in luminance of the pixel as being significantly invariable relative to viewing angle;

a liquid crystal layer, proximate to said plurality of subpixels, having a thickness;

a compensative retardation film, proximate to said liquid crystal layer, for reducing dark state light leakage for off-normal viewing angles due to a birefringence of the liquid crystal layer;

a first polarizer proximate to said plurality of subpixels; and a second polarizer proximate to said compensative retardation film.

15. The display of claim 14, wherein said first and second polarizers are arranged in a crossed configuration for a normally white mode of operation.

16. The display of claim 15, wherein said compensative retardation film has a negative birefringence.

17. The display of claim 14, wherein said first and second polarizers are arranged in a parallel configuration for a normally black operation.

18. The display of claim 17, wherein said compensation film has a positive birefringence.

19. The display of claim 14, wherein the thickness of said liquid crystal layer is varied to achieve optimum contrast for each of red, green and blue colors.

20. The display of claim 14, wherein each subpixel is divided into a plurality of complementary domains having complementary electro-optical performance to achieve a symmetric electro-optic response for various viewing angles.

21. The display of claim 14, wherein adjacent pixels of a pixel of the plurality of pixels have complementary liquid crystal domains relative to the pixel, resulting in complementary electro-optic performance to achieve a symmetric electro-optic response for various viewing angles.

* * * * *